May 26, 1925.
H. E. ADAMS
PRESSURE GAUGE
Filed April 27, 1922
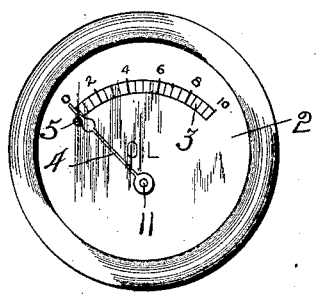
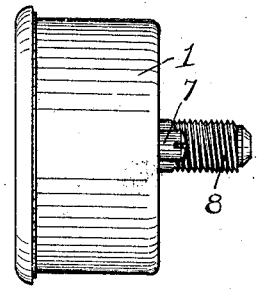
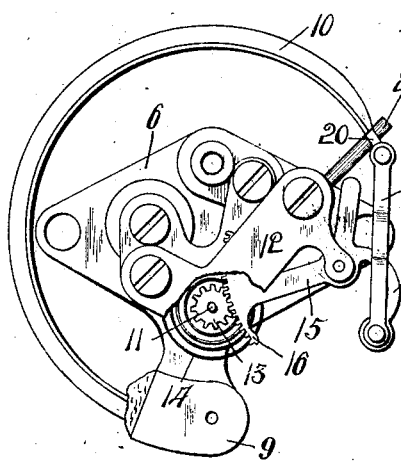
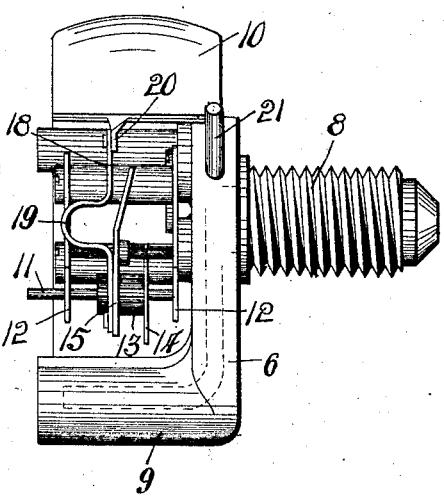
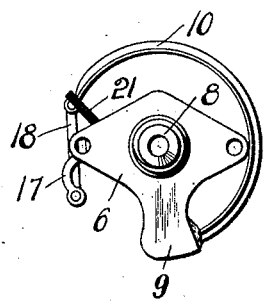
INVENTOR
Harry E. Adams.
By Owen Owen & Crampton.
Attys.

Patented May 26, 1925.

1,539,101

UNITED STATES PATENT OFFICE.

HARRY E. ADAMS, OF TOLEDO, OHIO, ASSIGNOR TO THE W. G. NAGEL ELECTRIC COMPANY, OF TOLEDO, OHIO, A CORPORATION OF OHIO.

PRESSURE GAUGE.

Application filed April 27, 1922. Serial No. 556,839.

*To all whom it may concern:*

Be it known that I, HARRY E. ADAMS, a citizen of the United States, and a resident of Toledo, in the county of Lucas and State of Ohio, have made an Invention Appertaining to a Pressure Gauge; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to pressure gauges and particularly to those of the expansion or Bourdon type.

In the use of gauges of this character considerable difficulty is experienced in maintaining a proper adjustment of the delicate gauge parts and in preventing a bending of the pointer or index finger or a straining of the delicate operating parts due to sudden shocks or jars on the instrument tending to move the free end of the expansion tube inward instead of outward from normal position. In instruments of this class the index finger rests against the stop pin at the starting end of the pressure scale and it is therefore evident that when the pressure tube is moved inward instead of outward from its normal at rest position, either from a sudden shock or otherwise, the index finger will be prevented from moving by reason of its engagement with the stop pin, so that an undue strain is set up on the delicate mechanism connecting the pressure tube and index finger, and tends to either throw such mechanism out of calibration or to bend the index finger, and in either case to cause an error in the pressure reading.

The object of my invention is to obviate such objections by providing a positive stop means for the pressure tube to prevent an inward movement thereof beyond normal position, thereby enhancing the practicability and commercial value of instruments of this character.

The invention is fully described in the following specification, and while, in its broader aspect, it is capable of embodiment in numerous forms, a preferred embodiment thereof is illustrated in the accompanying drawings, in which,—

Fig. 1 is a face view of a pressure gauge embodying the invention. Fig. 2 is an edge view thereof. Fig. 3 is an enlarged front view of the inner works of the gauge removed from the case, with a part broken away. Fig. 4 is an enlarged side elevation thereof, and Fig. 5 is a reduced rear view of the works.

Referring to the drawings, 1 designates a case in which the pressure gauge mechanism is mounted, the front of the case being provided with a dial plate 2 having a pressure scale 3 thereon with which the index finger 4 of the gauge mechanism registers, such finger being of the oscillating type and having its movement in backward reading direction stopped at the starting end or zero point of the scale by a stop pin 5 with which it coacts, as shown in Fig. 1.

The gauge works, which are mounted within the case 1, includes a frame 6 rigidly secured to the bottom of the case by screws 7, or in any other suitable manner, and has a nipple 8 projecting therefrom through the case bottom for connection with a tube leading to a source of fluid pressure. The frame 6 has an arm 9 at one side thereof to which one end of an arcuate expansion tube 10 of the Bourdon type is fixedly secured, the other end of the tube being free to have contracting or expanding movements, as well understood in the art. The tube passage is in communication with the passage through the nipple 8 through a passage provided in the frame 6 and its arm 9.

The index finger 4 is mounted on the outer end of a shaft 11, which is journaled in spaced frame parts 12 and extends at its outer end through the dial plate 2. This shaft carries a small pinion 13 and is also connected to the inner end of a coiled hair spring 14, the opposite end of which is anchored to a frame part as is customary with instruments of this character. A lever 15 is fulcrumed at one side of the pinion 13 and has one arm provided with a segmental rack 16 in mesh with the pinion, while its other arm is bent as shown at 17 and connected by a link 18 to the free end of the pressure tube 10. It is thus evident that any movement of the pressure tube will be communicated to the lever 15 and through it to the shaft 11 and index finger 4. The link 18 is customarily provided with a bow 19 which may be bent to effect a lengthening or shortening of the link for calibration. Calibration of the instrument may also be effected by bending the lever arm 17 or the finger 20, which projects from the pressure tube and is connected to the link 18. When the instrument is properly calibrated the index finger 4, when in normal position, or when no pressure is present in the tube 10, should register with the zero mark of the scale 3 and rest freely against the stop-pin 5. The mechanism which has been described is common to pressure gauges now used and it is therefore not thought necessary to specifically describe the same.

In carrying out my invention I provide the frame 6, or some other stationary part of the instrument, with a pin 21 disposed in position for the free end edge or some part of the pressure tube 10, when in normal position, to coact therewith and be prevented thereby from further inward or contracting movement. It is found preferable in practice to project this pin from an edge of the frame 6 into position to coact with the free end edge of the tube when the tube is in normal position with the index finger 4 disposed at zero point on the scale but without pressure against the stop pin 5. The pin 21 should be bendable so that after mounting in the base 6 or other carrying part it can be adjusted or calibrated to have proper stop coaction with the tube.

It is found in practice that the provision of a positive stop means to prevent an inward or contracting movement of the pressure tube beyond normal position eliminates to a very large extent the difficulties which have been experienced in maintaining proper calibration of the gauge parts not only in use but in handling and shipping, thereby insuring accuracy and dependability of such gauges.

I wish it understood that my invention is not limited to any specific construction, arrangement or form of the parts as it is capable of numerous modifications and changes without departing from the spirit of the claims.

Having thus described my invention, what I claim as new and desire to secure by Letters Patent, is,—

1. In a pressure gauge in combination with a Bourdon tube formed for connection at one end to a source of pressure, pressure indicating means operated by the tube, and a stop to engage said indicating means when at the starting position thereof, a pin disposed to engage the free end of the tube when said indicating means is at said starting position thereby to prevent movement of the tube in a direction to cause same to exert pressure of the indicating means against the stop.

2. In a pressure gauge in combination with a Bourdon tube formed for connection at one end to a source of pressure, pressure indicating means operated by the tube, and a stop to engage said indicating means when at the starting position thereof, adjustable means to engage the free end of the tube when said indicating means is at said starting position, said adjustable means being located in juxtaposition to the free end edge of the tube thereby to prevent movement of the tube in a direction to cause same to exert pressure of the indicating means against the stop.

In testimony whereof I have hereunto subscribed my name to this specification.

HARRY E. ADAMS.